(12) United States Patent
Tagami

(10) Patent No.: US 12,529,822 B2
(45) Date of Patent: Jan. 20, 2026

(54) OPTICAL ELEMENT, OPTICAL APPARATUS, IMAGING APPARATUS, AND COMPOUND

(71) Applicant: CANON KABUSHIKI KAISHA, Tokyo (JP)

(72) Inventor: Kei Tagami, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1055 days.

(21) Appl. No.: 17/512,475

(22) Filed: Oct. 27, 2021

(65) Prior Publication Data
US 2022/0137261 A1     May 5, 2022

(30) Foreign Application Priority Data
Nov. 2, 2020   (JP) .................. 2020-183651

(51) Int. Cl.
G02B 1/04 (2006.01)
C08F 22/22 (2006.01)

(52) U.S. Cl.
CPC .............. G02B 1/041 (2013.01); C08F 22/22 (2013.01)

(58) Field of Classification Search
None
See application file for complete search history.

(56) References Cited

U.S. PATENT DOCUMENTS

| | | | | |
|---|---|---|---|---|
| 11,500,129 | B2 * | 11/2022 | Tagami | ................ C07D 303/22 |
| 2014/0030644 | A1 | 1/2014 | Hasegawa | |

FOREIGN PATENT DOCUMENTS

| | | | |
|---|---|---|---|
| CN | 1902250 A | | 1/2007 |
| CN | 110382590 A | | 10/2019 |
| CN | 110462449 A | | 11/2019 |
| JP | 2000066425 A | | 3/2000 |
| JP | 2007011320 A | | 1/2007 |
| JP | 2007176921 A | * | 7/2007 |
| JP | 2008165248 A | | 7/2008 |
| JP | 2011053518 A | | 3/2011 |
| JP | 2016178240 A | * | 10/2016 |
| JP | 2018165355 A | | 10/2018 |

* cited by examiner

*Primary Examiner* — Sanza L. McClendon
(74) *Attorney, Agent, or Firm* — Canon U.S.A., Inc. IP Division

(57) ABSTRACT

An optical element containing a cured product of a resin composition containing a compound represented by the formula (1):

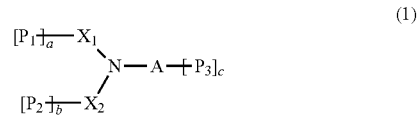

(1)

wherein $X_1$ denotes a substituted phenyl group with at least one trifluoromethyl group and is optionally substituted with a hydrogen atom, C1-C4 alkyl group, and/or C1-C3 alkylene group, $X_2$ denotes a substituted or unsubstituted phenyl group, A denotes at least one of a substituted or unsubstituted phenyl group and a substituted or unsubstituted biphenyl group, the substituted phenyl group of $X_2$ and the substituted phenyl group and the substituted biphenyl group of A have at least one of a hydrogen atom, trifluoromethyl group, C1-C4 alkyl group, and C1-C3 alkylene group, and $P_1$, $P_2$, and $P_3$ denote an acryloyloxy group or a methacryloyloxy group, a, b, and c denote an integer of 0 to 2, and a+b+c denotes an integer of 1 to 3.

9 Claims, 2 Drawing Sheets

OPTICAL ELEMENT, OPTICAL APPARATUS, IMAGING APPARATUS, AND COMPOUND

BACKGROUND OF THE INVENTION

Field of the Invention

The present disclosure relates to an optical element, an optical apparatus, an imaging apparatus, and a compound.

Description of the Related Art

In general, an optical material, such as a lens material or an organic resin, has a higher refractive index at a shorter wavelength. The Abbe number ($v_d$) and the secondary dispersion characteristics ($\theta_{g,F}$) are known as indicators of the wavelength dispersion characteristics of the refractive index. The Abbe number and the secondary dispersion characteristics, which are characteristic of each optical material, are within a certain range in many cases.

The Abbe number ($v_d$, Abbe number with respect to the d line) and the secondary dispersion characteristics ($\theta_{g,F}$) are represented by the following formulae.

$$v_d = (n_d - 1)(n_F - n_C)$$

$$\theta_{g,F} = (n_g - n_F)/(n_F - n_C)$$

$v_d$: a refractive index at a wavelength of 587.6 nm
$n_F$: a refractive index at a wavelength of 486.1 nm
$n_C$: a refractive index at a wavelength of 656.3 nm
$n_g$: a refractive index at a wavelength of 435.8 nm However, optical materials with a high secondary dispersion characteristics outside the certain range have also been synthesized by carefully designing the structure (the type of material and the molecular structure) of optical materials (lens materials, organic resins, etc.).

To produce an aspherical optical element with a good chromatic aberration correction function, a method of forming an organic resin on a spherical glass or the like is superior in mass-productiveness, formability, freedom of shape, and lightweight properties to the use of a lens material as a material. However, the optical characteristics of known organic resins are within the certain range, and few organic resins have exceptional dispersion characteristics. Japanese Patent Laid-Open No. 2011-53518 discloses a resin material composition with a high secondary dispersion characteristics.

SUMMARY OF THE INVENTION

An optical element for solving the above disadvantages is an optical element containing a cured product of a polymer of a resin composition, wherein the resin composition contains a compound represented by the following formula (1):

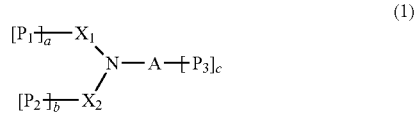

(1)

wherein $X_1$ denotes a substituted phenyl group, the substituted phenyl group having at least one trifluoromethyl group and optionally substituted with at least one member selected from the group consisting of a hydrogen atom, an alkyl group having 1 to 4 carbon atoms, and an alkylene group having 1 to 3 carbon atoms, $X_2$ denotes a substituted or unsubstituted phenyl group, the substituted phenyl group having at least one member selected from the group consisting of a hydrogen atom, a trifluoromethyl group, an alkyl group having 1 to 4 carbon atoms, and an alkylene group having 1 to 3 carbon atoms, A denotes at least one member selected from the group consisting of a substituted or unsubstituted phenyl group and a substituted or unsubstituted biphenyl group, the substituted phenyl group and the substituted biphenyl group having at least one member selected from the group consisting of a hydrogen atom, a trifluoromethyl group, an alkyl group having 1 to 4 carbon atoms, and an alkylene group having 1 to 3 carbon atoms, and $P_1$, $P_2$, and $P_3$ independently denote an acryloyloxy group or a methacryloyloxy group, a, b, and c denote any one of 0, 1, and 2, and a+b+c denotes any one of 1, 2, and 3.

Further features of the present disclosure will become apparent from the following description of exemplary embodiments with reference to the attached drawings.

DESCRIPTION OF THE EMBODIMENTS

Figure 1A:
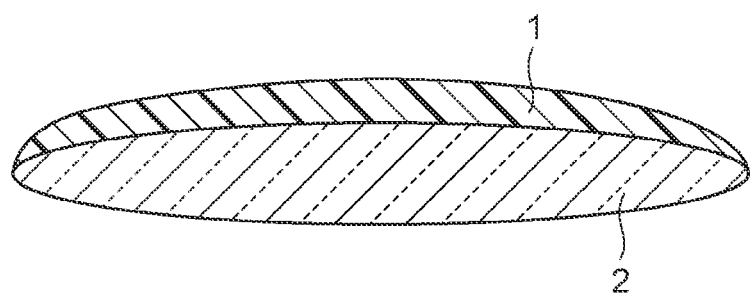
FIG. 1A is a schematic cross-sectional view of an optical element according to the present disclosure in the thickness direction.

Although a cured product of the material composition disclosed in Japanese Patent Laid-Open No. 2011-53518 has a high secondary dispersion characteristics, the cured product has insufficient transmittance and has insufficient characteristics as an optical element. As a result of extensive studies, the present inventor has found that a cured product of a polymer of a resin composition containing a specific compound has a high secondary dispersion characteristics and high transmittance. More specifically, it has been found that a compound with an aromatic ring composed only of a phenyl group and/or a biphenyl group and having a phenyl group substituted with a trifluoromethyl group can have both a high secondary dispersion characteristics and high transmittance.

Embodiments of the present disclosure are described below with reference to the accompanying drawings. The present disclosure is not limited to these embodiments. Various alterations and modifications can be made in these embodiments on the basis of the common knowledge of those skilled in the art without departing from the gist of the present disclosure. Such alterations and modifications also fall within the scope of the present disclosure.

A compound according to the present disclosure is represented by the following general formula (1):

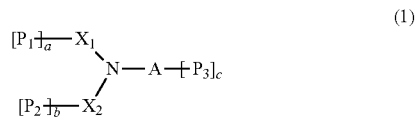

(1)

wherein $X_1$ denotes a substituted phenyl group, and the substituted phenyl group has at least one trifluoromethyl group, the substituted phenyl group is optionally substituted with at least one selected from the group consisting of a hydrogen atom, an alkyl group having 1 to 4 carbon atoms, and an alkylene group having 1 to 3 carbon atoms, $X_2$ denotes a substituted or unsubstituted phenyl group, the substituted phenyl group having at least one selected from the group consisting of a hydrogen atom, a trifluoromethyl group, an alkyl group having 1 to 4 carbon atoms, and an alkylene group having 1 to 3 carbon atoms, A denotes at least one selected from the group consisting of a substituted or unsubstituted phenyl group and a substituted or unsubstituted biphenyl group, the substituted phenyl group and the substituted biphenyl group have at least one selected from the group consisting of a hydrogen atom, a trifluoromethyl group, an alkyl group having 1 to 4 carbon atoms, and an alkylene group having 1 to 3 carbon atoms, and $P_1$, $P_2$, and $P_3$ independently denote an acryloyloxy group or a methacryloyloxy group, a, b, and c denote any one of 0, 1, and 2, and a+b+c denotes any one of 1, 2, and 3.

In general, compounds with a long conjugated structure exemplified by aromatic compounds have a smaller band gap than general-purpose materials, and therefore an absorption edge in an ultraviolet band is located on the side of a visible light region. Consequently, compounds with a long conjugated structure have a high refractive index and a high secondary dispersion characteristics. However, simply linking aromatic compounds together to form a long conjugated structure cannot provide a practical material. For example, large aromatic compounds have disadvantages of synthesis, coloring, a decrease in transmittance in the short-wavelength side of the visible light region, compatibility with other compounds, and crystal precipitation in the composition.

Thus, when a compound is used as an optical material, the length of the conjugated structure of the compound should be adjusted to improve transmittance and suppress crystallinity. However, a decrease in the length of the conjugated structure of an aromatic compound or an increase in the intermolecular distance due to steric hindrance of a substituent to improve transmittance and suppress crystallinity results in a decrease in the refractive index or secondary dispersion characteristics.

The inventor considers a compound represented by the formula (1) according to the present disclosure as described below.

The steric hindrance of the trifluoromethyl group in $X_1$ improves transmittance. Furthermore, an aromatic ring composed only of a monocyclic aromatic, such as a phenyl group and/or a biphenyl group, in the compound can have a longer intermolecular distance and higher transmittance than fused rings while maintaining a high secondary dispersion characteristics. Furthermore, the same two aromatic rings ($X_1$ and $X_2$ denote the same substituted phenyl group) in the compound increase symmetry and decrease the intermolecular distance. When the decrease in intermolecular distance is in such a narrow range that the transmittance does not decrease, the transmittance is maintained, and a high secondary dispersion characteristics and high transmittance can be achieved simultaneously.

The alkyl group having 1 to 4 carbon atoms that substitutes for the phenyl group in $X_1$ and $X_2$ and for the phenyl group or the biphenyl group in A in the formula (1) is a methyl group, an ethyl group, or a n-propyl group, for example. Examples also include a n-butyl group, an iso-propyl group, an iso-butyl group, a sec-butyl group, and a tert-butyl group. The alkyl group is not limited to these, provided that a high secondary dispersion characteristics can be achieved, and can be a methyl group or an ethyl group.

The alkylene group having 1 to 3 carbon atoms that substitutes for the phenyl group in $X_1$ and $X_2$ and for the phenyl group or the biphenyl group in A in the formula (1) is a methylene group, an ethylene group, or a n-propylene group, for example. The alkylene group can be a methylene group or an ethylene group.

Tables 1 to 3 show specific examples of a compound according to the present disclosure represented by the formula (1). A compound according to the disclosure is not limited to these. A compound according to the present disclosure may be a homopolymer or a copolymer, which may be used in combination.

$P_1$, $P_2$, and $P_3$ in the formula (1) independently denote an acryloyloxy group or a methacryloyloxy group, which is a polymerizable functional group.

Exemplary compounds M1 to M11 in Table 1 are compounds with one acryloyloxy or methacryloyloxy group in which $X_1$ and $X_2$ in the formula (1) are the same.

Exemplary compounds M12 to M19 in Table 2 are compounds with one acryloyloxy or methacryloyloxy group in which $X_1$ and $X_2$ in the formula (1) are different.

Exemplary compounds M21 to M30 in Table 3 are compounds with two or three acryloyloxy or methacryloyloxy groups in the formula (1).

TABLE 1

| No. | $P_1$ | a | $X_1$ | $P_2$ | b | $X_2$ | A | $P_3$ | c |
|---|---|---|---|---|---|---|---|---|---|
| M1 | — | 0 | (3-CF₃-phenyl) | — | 0 | (3-CF₃-phenyl) | (1,4-phenylene) | (methacryloyloxy) | 1 |
| M2 | — | 0 | (4-CF₃-phenyl) | — | 0 | (4-CF₃-phenyl) | (1,4-phenylene) | (methacryloyloxy) | 1 |

TABLE 1-continued

| No. | P₁ | a | X₁ | P₂ | b | X₂ | A | P₃ | c |
|---|---|---|---|---|---|---|---|---|---|
| M3 | — | 0 | 4-F₃C-C₆H₄– | — | 0 | 4-F₃C-C₆H₄– | –C₆H₄–CH₂CH₂– | methacrylate ester | 1 |
| M4 | — | 0 | 3-F₃C-C₆H₄– | — | 0 | 3-F₃C-C₆H₄– | –C₆H₄–(CH₂)₃– (branched) | methacrylate ester | 1 |
| M5 | — | 0 | 3-F₃C-C₆H₄– | — | 0 | 3-F₃C-C₆H₄– | trimethyl-substituted phenylene | methacrylate ester | 1 |
| M6 | — | 0 | 3-F₃C-C₆H₄– | — | 0 | 3-F₃C-C₆H₄– | 1,2-(CH₂-)C₆H₄– | methacrylate ester | 1 |
| M7 | — | 0 | 4-F₃C-C₆H₄– | — | 0 | 4-F₃C-C₆H₄– | biphenyl-4,4′-diyl | methacrylate ester | 1 |
| M8 | — | 0 | 4-F₃C-C₆H₄– | — | 0 | 4-F₃C-C₆H₄– | biphenyl-CH₂CH₂– | methacrylate ester | 1 |
| M9 | — | 0 | 3-F₃C-C₆H₄– | — | 0 | 3-F₃C-C₆H₄– | terphenyl (ortho-branched) | methacrylate ester | 1 |
| M10 | — | 0 | 3-F₃C-C₆H₄– | — | 0 | 3-F₃C-C₆H₄– | biphenyl (meta,para-branched) | acrylate ester | 1 |

TABLE 1-continued
| No. | P₁ | a | X₁ | P₂ | b | X₂ | A | P₃ | c |
|-----|----|----|----|----|----|----|----|----|----|
| M11 | — | 0 | 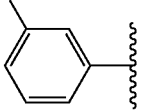 | — | 0 | 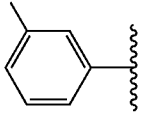 | 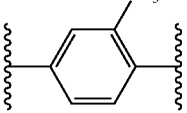 | 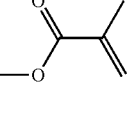 | 1 |
TABLE 2
| No. | P₁ | a | X₁ | P₂ | b | X₂ | A | P₃ | c |
|-----|----|----|----|----|----|----|----|----|----|
| M12 | — | 0 | 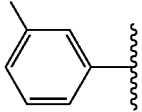 | — | 0 | 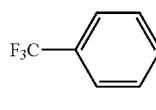 | 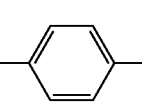 | 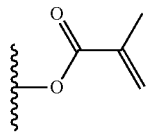 | 1 |
| M13 | — | 0 | 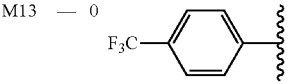 | — | 0 | 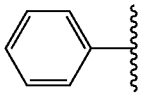 | 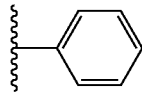 | 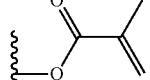 | 1 |
| M14 | — | 0 | 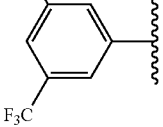 | — | 0 | 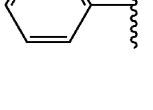 | 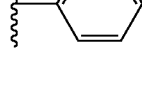 | 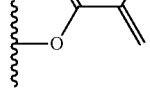 | 1 |
| M15 | — | 0 | 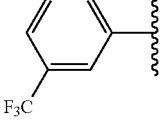 | — | 0 | 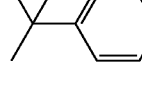 | 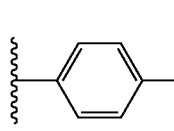 | 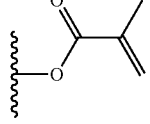 | 1 |
| M16 | — | 0 | 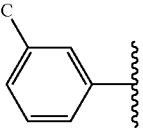 | 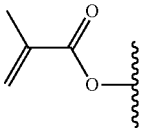 [SMILES: *OC(=O)C(=C)C] | 1 | 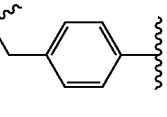 | 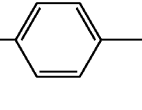 | — | 0 |
| M17 | — | 0 | 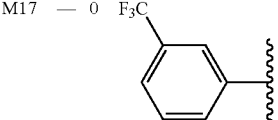 | 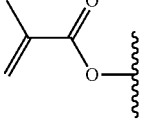 | 1 | 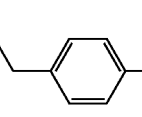 | 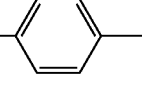 | — | 0 |
| M18 | — | 0 | 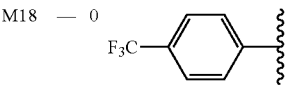 | 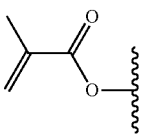 [SMILES: *OC(=O)C(=C)C] | 1 | 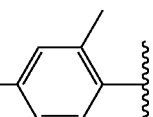 | 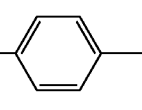 | — | 0 |

TABLE 2-continued

| No. | P₁ | a | X₁ | P₂ | b | X₂ | A | P₃ | c |
|---|---|---|---|---|---|---|---|---|---|
| M19 | — | 0 | 4-(F₃C)C₆H₄– | methacrylate ester linker | 1 | –CH₂CH₂–C₆H₄– | 4,4'-biphenyl-CF₃ | — | 0 |

TABLE 3

| No. | P₁ | a | X₁ | P₂ | b | X₂ | A | P₃ | c |
|---|---|---|---|---|---|---|---|---|---|
| M21 | — | 0 | 4-(F₃C)C₆H₄– | — | 0 | 4-(F₃C)C₆H₄– | 1,3,5-trisubstituted phenyl | methacrylate | 2 |
| M22 | — | 0 | 3-(F₃C)C₆H₄– | — | 0 | 3-(F₃C)C₆H₄– | 1,2,4-trisubstituted phenyl | methacrylate | 2 |
| M23 | — | 0 | 3-(F₃C)C₆H₄– | — | 0 | 3-(F₃C)C₆H₄– | biphenyl trisubstituted | methacrylate | 2 |
| M24 | — | 0 | 4-(F₃C)C₆H₄– | — | 0 | 4-(F₃C)C₆H₄– | biphenyl trisubstituted | methacrylate | 2 |
| M25 | — | 0 | 3-(F₃C)C₆H₄– | — | 0 | 3-(F₃C)C₆H₄– | terphenyl trisubstituted | methacrylate | 2 |
| M26 | — | 0 | 3-(F₃C)C₆H₄– | — | 0 | 3-(F₃C)C₆H₄– | biphenyl trisubstituted | methacrylate | 2 |

TABLE 3-continued

| No. | P₁ | a | X₁ | P₂ | b | X₂ | A | P₃ | c |
|---|---|---|---|---|---|---|---|---|---|
| M27 | 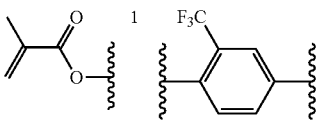 | 1 | 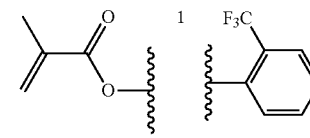 | 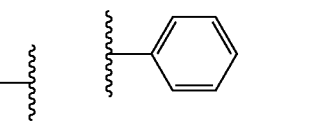 | 1 |  |  | — | 0 |
| M28 | 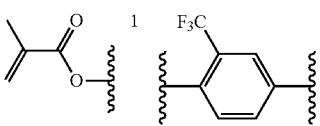 | 1 | 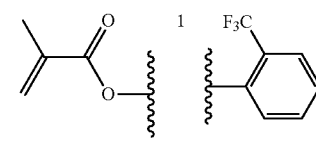 | 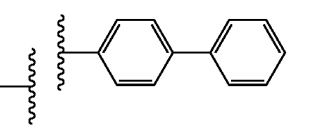 | 1 | 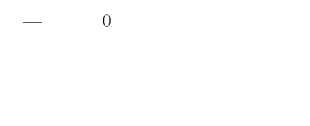 |  | — | 0 |
| M29 | 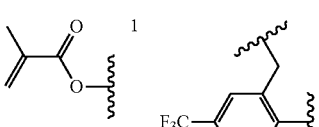 | 1 | 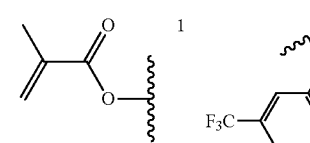 | 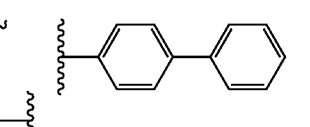 | 1 | 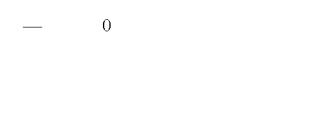 |  | — | 0 |
| M30 | — | 0 | 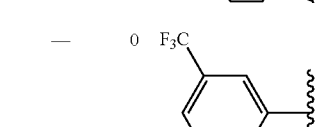 | 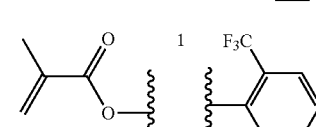 | 1 | 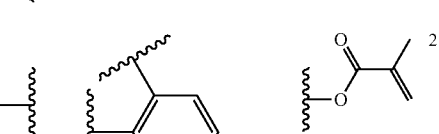 |  |  | 2 |

A method for manufacturing a compound represented by the formula (1) according to the present disclosure is described below by way of example.

A method for manufacturing a compound represented by the formula (1) may be any manufacturing method, including a known synthesis method. For example, a compound with a structure represented by the formula (1) can be synthesized by a known synthesis method, for example, described in Japanese Patent Laid-Open No. 2000-066425 or Japanese Patent Laid-Open No. 2008-165248.

A polymerizable functional group can be introduced into a compound represented by the formula (1) by two methods. In one method, a polymerizable functional group is directly introduced to form a compound represented by the formula (1). In the other method, a structure with a polymerizable functional group or with a precursor functional group of the polymerizable functional group is introduced into a precursor of a compound represented by the formula (1). The latter method may be a method of introducing an aryl group with a functional group by a coupling reaction of a monoarylamine derivative in the presence of a metal catalyst and a base.

An unsaturated hydrocarbon group (for example, an acrylic group or a methacrylic group) can be introduced into a compound represented by the formula (1) by the following method. In one method, a (meth)acrylate interacts with a compound represented by the formula (1) having a hydroxy group. In another method, a polymerizable functional group is directly introduced to form a compound represented by the formula (1).

Any coupling reaction with a metal catalyst may be used. Typical methods include an Ullmann reaction using copper, a Buchwald-Hartwig reaction using an amine or the like, Suzuki coupling using boric acid or the like, Stille coupling using an organotin, and Negishi coupling using an organozinc.

Any method can be selected for the (meth)acrylate reaction. Typical methods include a method of esterifying a hydroxy group with a (meth)acrylic acid halide or (meth)acrylic acid anhydride and a transesterification reaction using an ester of a lower alcohol and (meth)acrylic acid. Furthermore, a direct esterification reaction of (meth)acrylic acid and a diol by dehydration condensation with a dehydrating and condensing agent, such as N,N'-dicyclohexylcarbodiimide, or a method of superheating (meth)acrylic acid and a diol in the presence of a dehydrating agent, such as sulfuric acid, is suitably used.

Furthermore, a polymerization inhibitor may be used to prevent polymerization of a compound represented by the formula (1) during the reaction or storage. Examples of the polymerization inhibitor include hydroquinones, such as p-benzoquinone, hydroquinone, hydroquinone monomethyl ether, and 2,5-diphenylparabenzoquinone, and N-oxy radicals, such as tetramethylpiperidinyl-N-oxy radical (TEMPO). Also included are substituted catechols, such as t-butylcatechol, amines, such as phenothiazines, diphenylamine, and phenyl-β-naphthylamine, nitrosobenzene, picric acid, molecular oxygen, sulfur, and copper (II) chloride. Among these, hydroquinones, phenothiazines, and N-oxy radicals, particularly hydroquinones, can be used for general purposes and to inhibit polymerization.

The amount of polymerization inhibitor to be used is typically 10 ppm or more, preferably 50 ppm or more, and 10,000 ppm or less, preferably 1000 ppm or less, of the compound represented by the formula (1). An excessively small amount of polymerization inhibitor has no or small effects and results in polymerization during the reaction or during concentration in a post-treatment step. On the other hand, an excessively large amount of polymerization inhibitor may become an impurity in the production of a resin composition described later or may have adverse effects on polymerization reactivity or the like.

A resin composition containing a compound according to the present disclosure is described below.

A resin composition for use in the present disclosure contains a polymerization initiator, a polymerization inhibitor, and, if necessary, a photosensitizer, a heat stabilizer, a light stabilizer, an oxidation inhibitor, and a resin in a compound represented by the formula (1).

A compound represented by the formula (1) preferably constitutes 1.0% to 99% by mass, more preferably 50% to 99% by mass, of the resin composition.

The polymerization initiator may be, but is not limited to, a polymerization initiator that generates a radical species or a cationic species by light irradiation or a polymerization initiator that generates a radical species by heat.

Examples of the polymerization initiator that generates a radical species by light irradiation include 2-benzyl-2-dimethylamino-1-(4-morpholinophenyl)-1-butanone and 1-hydroxy-cyclohexyl-phenylketone. Also included are 2-hydroxy-2-methyl-1-phenyl-propan-1-one, bis(2,4,6-trimethylbenzoyl)-phenylphosphine oxide, 4-phenylbenzophenone, and 4-phenoxybenzophenone. Also included are 4,4'-diphenylbenzophenone and 4,4'-diphenoxybenzophenone. The polymerization initiator that generates a radical species by light irradiation is not limited to these.

Examples of the polymerization initiator that generates a cationic species by light irradiation include, but are not limited to, iodonium (4-methylphenyl)[4-(2-methylpropyl)phenyl]-hexafluorophosphate.

Examples of the polymerization initiator that generates a radical species by heat include azo compounds, such as azobisisobutyronitrile (AIBN), benzoyl peroxide, t-butyl peroxypivalate, and t-butyl peroxyneohexanoate. Also included are peroxides, such as t-hexyl peroxyneohexanoate, t-butyl peroxyneodecanoate, t-hexyl peroxyneodecanoate, and cumyl peroxyneohexanoate. The polymerization initiator that generates a radical species by heat is not limited to these.

When polymerization is initiated by light, such as ultraviolet radiation, a known sensitizer can be used. Examples of the sensitizer include benzophenone, 4,4-diethylaminobenzophenone, and 1-hydroxycyclohexyl phenyl ketone. Also included are isoamyl p-dimethylaminobenzoate, methyl 4-dimethylaminobenzoate, benzoin, benzoin ethyl ether, benzoin isobutyl ether, benzoin isopropyl ether, and 2,2-diethoxyacetophenone. Also included are methyl o-benzoylbenzoate, 2-hydroxy-2-methyl-1-phenylpropan-1-one, and acylphosphine oxide. The sensitizer is not limited to these.

The content ratio of a photopolymerization initiator to a polymerizable resin component can be appropriately selected in accordance with irradiated light and additional heating temperature. The content ratio may also be adjusted in accordance with the target average molecular weight of the resulting polymer.

The amount of photopolymerization initiator used for polymerization (curing) and forming of a resin composition in the present disclosure preferably ranges from 0.01% to 10.00% by mass of the polymerizable components. The photopolymerization initiator may be used alone or in combination depending on the reactivity of the resin and the wavelength of light irradiation.

The light stabilizer may be any light stabilizer that does not significantly affect the optical characteristics of the cured product. Typical examples include benzotriazole materials, for example, 2-(2H-benzotriazol-2-yl)-p-cresol and 2-(2H-benzotriazol-2-yl)-4,6-bis(1-methyl-1-phenylethyl)phenol.

Also included are 2-[5-chloro(2H)-benzotriazol-2-yl]-4-methyl-6-(tert-butyl)phenol and 2-(2H-benzotriazol-2-yl)-4,6-di-tert-pentylphenol. Also included is 2-(2H-benzotriazol-2-yl)-4-(1,1,3,3-tetramethylbutyl)phenol. Also included are 2,2'-methylenebis[6-(2H-benzotriazol-2-yl)-4-(1,1,3,3-tetramethylbutyl)]phenol and 2-(2H-benzotriazol-2-yl)-6-dodecyl-4-methylphenol. Also included are cyanoacrylate materials, such as ethyl 2-cyano-3,3-diphenylacrylate and 2-ethylhexyl 2-cyano-3,3-diphenylacrylate. Also included are triazine materials and benzophenone materials, such as octabenzone and 2,2'-4,4'-tetrahydrobenzophenone.

The amount of light stabilizer used for polymerization (curing) and forming of a resin composition in the present disclosure preferably ranges from 0.01% to 10.00% by mass of the total amount of polymerizable components.

The heat stabilizer may be any heat stabilizer that does not significantly affect the optical characteristics of the cured product. For example, hindered phenol materials, such as pentaerythritoltetrakis[3-(3,5-di-tert-butyl-4-hydroxyphenyl)]propionate, may be used. Furthermore, octadecyl-3-(3,5-di-tert-butyl-4-hydroxyphenyl)propionate, benzene propanoic acid 3,5-bis(1,1-dimethylethyl)-4-hydroxy, and C7-C9 side-chain alkyl esters may also be used. Furthermore, 4,6-bis(octylthiomethyl)-o-cresol, 4,6-bis(dodecylthiomethyl)-o-cresol, and ethylenebis(oxyethylene)bis[3-(5-tert-butyl-4-hydroxy-m-tolyl)]propionate may also be used. Furthermore, hexamethylenebis[3-(3,5-di-tert-butyl-4-hydroxyphenyl)]propionate may also be used. Furthermore, phosphorus materials, such as tris(2,4-di-tert-butylphenyl) phosphite, and sulfur materials, such as dioctadecyl 3,3-thiodipropionate, may also be used.

The oxidation inhibitor may be any oxidation inhibitor that does not significantly affect the optical characteristics of the formed product, and may typically be a hindered amine material. For example, bis(2,2,6,6-tetramethyl-4-piperidyl) sebacate may be used. Furthermore, bis(1,2,2,6,6-pentamethyl-4-piperidyl)[[3,5-bis(1,1-dimethylethyl)-4-hydroxyphenyl]methyl]butylmalonate may also be used.

The amount of oxidation inhibitor used for polymerization (curing) and forming of a resin composition in the present disclosure preferably ranges from 0.01% to 10.00% by mass of the total amount of polymerizable components.

The resin in a resin composition for use in the present disclosure may be, but is not limited to, a (meth)acrylate compound, such as 1,3-adamantanediol dimethacrylate, 1,3-adamantane dimethanol dimethacrylate, tricyclodecane dimethanol diacrylate, pentaerythritol tetraacrylate, propoxylated neopentyl glycol diacrylate, dipropylene glycol diacrylate, ethoxylated bisphenol A dimethacrylate, tris(2-hydroxyethyl)isocyanurate triacrylate, 2(2-ethoxyethoxy)ethyl acrylate, stearyl acrylate, tetrahydrofurfuryl acrylate, 2-phenoxyethyl acrylate, isodecyl acrylate, isobornyl acrylate, isobornyl methacrylate, 1,3-butylene glycol diacrylate, 1,4-butanediol diacrylate, diethylene glycol diacrylate, 1,6-hexanediol diacrylate, triethylene glycol diacrylate, tripropylene glycol diacrylate, dipropylene glycol diacrylate, triethylene glycol dimethacrylate, ethylene glycol dimethacrylate, tetraethylene glycol dimethacrylate, 1,4-butanediol dimethacrylate, diethylene glycol dimethacrylate, 1,6-hexanediol dimethacrylate, tripropylene glycol dimethacrylate, dipropylene glycol dimethacrylate, trimethylolpropane trimethacrylate, 9,9-bis[4-(2-acryloyloxyethoxy)phenyl]fluorene, 9,9-bis[4-(2-methacryloyloxyethoxy)phenyl]fluorene, 9,9-bis[4-(2-acryloyloxy)phenyl]fluorene, 9,9-bis[4-(2-methacryloyloxy)phenyl]fluorene, benzyl acrylate, benzyl methacrylate, butoxyethyl acrylate, butoxymethyl methacrylate, cyclohexyl acrylate, cyclohexyl methacrylate, 2-hydroxyethyl acrylate, 2-hydroxymethyl methacrylate, glycidyl acrylate, glycidyl methacrylate, phenoxyethyl acrylate, phenoxyethyl methacrylate, phenyl methacrylate, ethylene glycol diacrylate, ethylene glycol dimethacrylate, diethylene glycol diacrylate, diethylene glycol dimethacrylate, triethylene glycol diacrylate, triethylene glycol dimethacrylate, tetraethylene glycol diacrylate, tetraethylene glycol dimethacrylate, poly(ethylene glycol) diacrylate, poly(ethylene glycol) dimethacrylate, neopentyl glycol diacrylate, neopentyl glycol dimethacrylate, ethylene glycol bisglycidyl acrylate, ethylene glycol bisglycidyl methacrylate, bisphenol A diacrylate, bisphenol A dimethacrylate, 2,2-bis(4-acryloxyethoxyphenyl)propane, 2,2-bis(4-methacryloxyethoxyphenyl)propane, 2,2-bis(4-acryloxydiethoxyphenyl)propane, 2,2-bis(4-methacryloxydiethoxyphenyl)propane, bisphenol F diacrylate, bisphenol F dimethacrylate, 1,1-bis(4-acryloxyethoxyphenyl)methane, 1,1-bis(4-methacryloxyethoxyphenyl)methane, 1,1-bis(4-acryloxydiethoxyphenyl)methane, 1,1-bis(4-methacryloxydiethoxyphenyl)methane, 1,1-bis(4-acryloxyethoxyphenyl)sulfone, 1,1-bis(4-methacryloxyethoxyphenyl)sulfone, 1,1-bis(4-acryloxydiethoxyphenyl) sulfone, 1,1-bis(4-methacryloxydiethoxyphenyl)sulfone, dimethylol tricyclodecane diacrylate, trimethylolpropane triacrylate, trimethylolpropane trimethacrylate, glycerol diacrylate, glycerol dimethacrylate, pentaerythritol triacrylate, pentaerythritol tetraacrylate, pentaerythritol tetramethacrylate, methylthio acrylate, methylthio methacrylate, phenylthio acrylate, benzylthio methacrylate, xylylenedithiol diacrylate, xylylenedithiol dimethacrylate, mercaptoethyl sulfide diacrylate, or mercaptoethyl sulfide dimethacrylate; an allyl compound, such as allyl glycidyl ether, diallyl phthalate, diallyl terephthalate, diallyl isophthalate, diallyl carbonate, or diethylene glycol bisallyl carbonate; a vinyl compound, such as styrene, chlorostyrene, methylstyrene, bromostyrene, dibromostyrene, divinylbenzene, or 3,9-divinylspirobi(m-dioxane); or diisopropenylbenzene. Acrylate resins and methacrylate resins have good optical characteristics and formability.

The resin may be a thermoplastic resin, including a polyolefin resin, for example, an ethylene homopolymer; a random or block copolymer of ethylene and one or two or more α-olefins, such as propylene, 1-butene, 1-pentene, 1-hexene, and 4-methyl–1-pentene; a random or block copolymer of ethylene and one or two or more of vinyl acetate, acrylic acid, methacrylic acid, methyl acrylate, and methyl methacrylate; a propylene homopolymer: a random or block copolymer of propylene and one or two or more α-olefins other than propylene, such as 1-butene, I-pentene, 1-hexene, and 4-methyl–1-pentene; a 1-butene homopolymer, an ionomer resin, or a mixture of these polymers: a hydrocarbon atom resin, such as a petroleum resin or terpene resin; a polyester resin, such as poly(ethylene terephthalate), poly(butylene terephthalate), or poly(ethylene naphthalate): a polyamide resin, such as nylon 6, nylon 66, nylon 11, nylon 12, nylon 610, nylon 6/66, nylon 66/610, or nylon MXD; an acrylic resin, such as poly(methyl methacrylate): a styrene-acrylonitrile resin, polystyrene, a styrene-acrylonitrile copolymer, a styrene-acrylonitrile-butadiene copolymer, or polyacrylonitrile; a polyvinyl alcohol resin, such as poly(vinyl alcohol) or an ethylene-vinyl alcohol copolymer; a polycarbonate resin; a polyketone resin: a polymethylene oxide resin; a polysulfone resin: a polyimide resin; or a polyamideimide resin. These may be used alone or in combination.

The resin content of the resin composition ranges from 0.01% to 99% by mass. The resin content of the resin composition preferably ranges from 0.01% to 50% by mass in terms of the refractive index characteristics of the resin composition and the brittleness of the formed product. Furthermore, to maintain the secondary dispersion characteristics and transmittance, an acrylate resin and a methacrylate resin can constitute 0.01% to 20.0% by mass.

[Optical Element]

An optical element according to the present disclosure is described below with reference to the drawings.

An optical element according to the present disclosure includes a cured product of a polymer of a resin composition described above. A cured product for use in the present disclosure has a high secondary dispersion characteristics of 0.70 or more. Thus, chromatic aberration can be efficiently eliminated in an optical element according to the present disclosure.

Figure 1B:
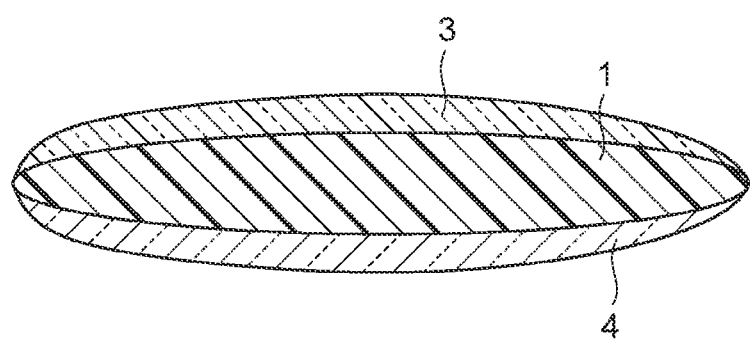
FIG. 1B is a schematic cross-sectional view of an optical element according to the present disclosure in the thickness direction.

FIGS. 1A and 1B are schematic cross-sectional views of an optical element according to an embodiment of the present disclosure in the thickness direction. In FIG. 1A, a thin film of a cured product 1 is provided on one surface of a transparent substrate 2.

The transparent substrate 2 may be formed of transparent resin or transparent glass. The term "transparent", as used herein, refers to a transmittance of 30% or more in the entire visible light region (light with a wavelength in the range of 380 to 780 nm). The transparent substrate 2 can be formed of glass, for example, common optical glass, such as silicate glass, borosilicate glass, or phosphate glass, quartz glass, or glass ceramic. The transparent substrate 2 can be circular in a plan view.

The optical element illustrated in FIG. 1A can be produced, for example, by a method of forming a thin layered structure on the transparent substrate 2. More specifically, a mold made of a metal material is placed at a certain distance from the transparent substrate 2, and the space between the mold and the transparent substrate 2 is filled with a flowable resin composition and is then lightly pressed for molding. If necessary, the resin composition is polymerized in this state.

Light irradiation for the polymerization reaction is performed using light with an appropriate wavelength, typically ultraviolet light or visible light, in accordance with a mechanism based on radical production using a photopolymerization initiator. For example, a raw material, such as a monomer, of a resin composition is uniformly irradiated with light through a light-transmitting material used as the transparent substrate 2. The amount of irradiation light is appropriately selected in accordance with a mechanism based on radical production using a photopolymerization initiator or in accordance with the photopolymerization initiator content.

To cure a resin composition in such a photopolymerization reaction, the entire molded resin composition can be uniformly irradiated with light. Thus, light irradiation can be performed using light with a wavelength capable of being uniformly emitted through a light-transmitting material used for the transparent substrate 2. In such a case, the thickness of the cured product 1 formed on the transparent substrate 2 can be reduced in the present disclosure.

In FIG. 1B, a thin film of the cured product 1 of the resin composition is located between transparent substrates 3 and 4. In FIG. 1B, each of the transparent substrates 3 and 4 has a concave surface facing each other and is in contact with the cured product 1, which is a lens having convex surfaces on both sides. The transparent substrates 3 and 4 may be formed of transparent resin or transparent glass and can be formed of glass. The glass can be common optical glass, such as silicate glass, borosilicate glass, or phosphate glass, quartz glass, or glass ceramic. The transparent substrates 3 and 4 can be circular in a plan view.

The optical element illustrated in FIG. 1B can be produced, for example, by pouring the resin composition between the transparent substrates 3 and 4 and lightly pressing the transparent substrates 3 and 4 for forming. The resin composition is then photopolymerized in this state. Thus, a stacked body is formed in which the cured product 1 is located between the transparent substrates 3 and 4.

Likewise, a formed product can also be formed by a thermal polymerization method. In such a case, it is desirable to make the overall temperature more uniform, and the total thickness of the formed product of the resin composition formed on the substrate of a light-transmitting material can be decreased in the present disclosure. When the total thickness of a formed product of the resin composition is increased, the dosage, radiation intensity, light source, and the like should be selected in consideration of the film thickness, the absorption of a resin component, and the absorption of a fine particle component.

[Optical Apparatus]

A specific application example of an optical element according to the present disclosure is described below. Specific application examples include lenses constituting optical apparatuses (imaging optical systems) for cameras and video cameras and lenses constituting optical apparatuses (projection optical systems) for liquid crystal projectors. Also included are pickup lenses for DVD recorders and the like. These optical systems are composed of a plurality of lenses arranged in a housing, and at least one of the plurality of lenses can be the optical element described above.

[Imaging Apparatus]

Figure 2:
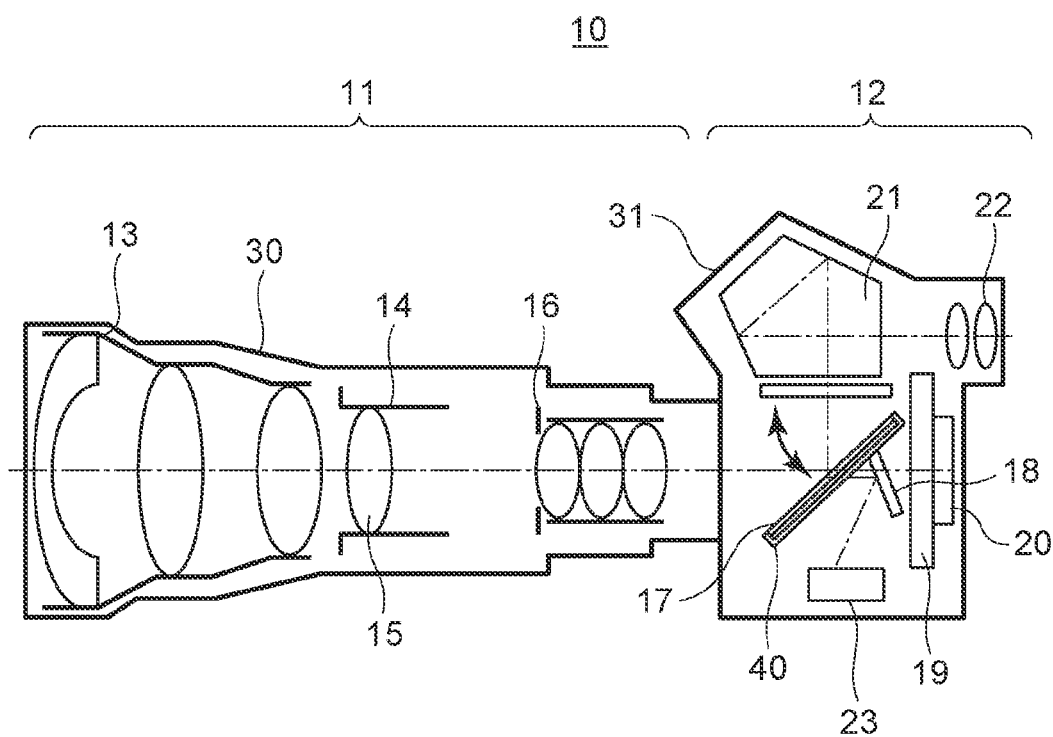
FIG. 2 is a schematic cross-sectional view of an imaging apparatus including an optical element according to the present disclosure.

FIG. 2 illustrates a digital single-lens reflex camera 10, which is an embodiment of an imaging apparatus including an optical element according to the present disclosure. FIG. 2 is a schematic cross-sectional view including an optical axis of the optical element used. Although a camera body 12 is coupled to a lens barrel 11, which is an optical apparatus, in FIG. 2, the lens barrel 11 is an interchangeable lens detachably mounted on the camera body 12.

Light from an object is captured through an optical system including lenses 13 and 15 arranged on the optical axis of an imaging optical system in a housing 30 of the lens barrel 11. An optical element according to the present disclosure can be used for the lenses 13 and 15, for example. The lens 15 is movably supported by an inner tube 14 relative to an outer tube of the lens barrel 11 for focusing and zooming.

In the observation period before photographing, light from an object is reflected by a main mirror 17 in a housing 31 of the camera body, passes through a prism 21, and then provides the photographer with an image to be photographed through a viewing lens 22. The main mirror 17 is a half mirror, for example. Light transmitted through the main mirror is reflected by a sub-mirror 18 in the direction of an autofocusing (AF) unit 23, and the reflected beam is used for focusing, for example. The main mirror 17 is attached to and supported by a main mirror holder 40 by adhesion or the like. For photographing, the main mirror 17 and the sub-mirror 18 are moved out of the optical path by a driving mechanism (not shown), a shutter 19 is opened, and an imaging device 20 receives light incident from the lens barrel 11 and passing through the imaging optical system, thereby focusing an optical image to be photographed. Furthermore, the diaphragm 16 is configured to change the aperture area and thereby change the brightness and the depth of focus while photographing.

Although an imaging apparatus is described above with respect to the digital single-lens reflex camera, an optical element according to the present disclosure can also be used in the same manner in smartphones, compact digital cameras, and the like.

EXEMPLARY EMBODIMENTS

The present disclosure is described in detail below in the following exemplary embodiments. However, the present disclosure is not limited to these exemplary embodiments within the gist of the present disclosure. Synthesized products were analyzed with an NMR apparatus ("JNM-ECA400" (product name) manufactured by JEOL Ltd.).

Exemplary Embodiment 1

Synthesis Example 1

(1) Synthesis of M1 Intermediate A

A 500-mL three-neck flask was charged with 15.0 g of 3-aminobenzotrifluoride, 20.95 g of 3-bromobenzotrifluoride, 26.85 g of sodium tert-butoxide, and 2.68 g of bis(dibenzylideneacetone) palladium in a nitrogen atmosphere. Furthermore, 4.44 g of 2-dicyclohexylphosphino-2',4',6'-triisopropylbiphenyl and 300 mL of o-xylene were added. The mixture was heated to 120° C. and was stirred at the temperature for 6 hours. The mixture was cooled to room temperature (25° C.), and an organic phase was extracted with ethyl acetate. The organic phase was washed with saturated saline and then with water and was dried over anhydrous magnesium sulfate. The resulting crude product was purified by column chromatography. Thus, 19.2 g of an M1 intermediate A was prepared (yield: 68%).

(2) Synthesis of M1 Intermediate B

A 1-L three-neck flask was charged with 10.0 g of the M1 intermediate A, 24.78 g of 4-bromobenzyl alcohol, 31.21 g of sodium tert-butoxide, and 0.47 g of bis(dibenzylideneacetone) palladium in a nitrogen atmosphere. Furthermore, 0.77 g of 2-dicyclohexylphosphino-2',4',6'-triisopropylbiphenyl and 500 mL of o-xylene were added. The mixture was heated to 120° C. and was stirred at the temperature for 10 hours. The mixture was cooled to room temperature (25° C.), and an organic phase was extracted with ethyl acetate. The organic phase was washed with saturated saline and then with water and was dried over anhydrous magnesium sulfate. The resulting crude product was purified by column chromatography. Thus, 17.2 g of an M1 intermediate B was prepared (yield: 51%).

(3) Synthesis of M1

A 500-mL three-neck flask was charged with 10.0 g of the M1 intermediate B, 350 mL of tetrahydrofuran, 0.90 g of hydroquinone monomethyl ether (MEHQ), and 13.5 mL of triethylamine in a nitrogen atmosphere. Subsequently, 12.4 g of methacrylic acid anhydride was added dropwise. The mixture was heated and stirred under reflux for 20 hours. The reaction liquid was diluted with toluene. The resulting organic phase was washed with acidic and basic aqueous solutions and saturated saline and was then dried over anhydrous magnesium sulfate. A crude product prepared by removing the solvent was purified by silica gel chromatography. Thus, 5.8 g of M1 was prepared (yield: 50%).

Synthesis Example 2

(1) Synthesis of M3 Intermediate

A 500-mL three-neck flask was charged with 21.58 g of 4-chlorobenzotrifluoride, 8.0 g of 2-(4-aminophenyl)ethanol, 66.50 g of cesium carbonate, and 0.33 g of bis(dibenzylideneacetone) palladium in a nitrogen atmosphere. Furthermore, 0.56 g of 2-dicyclohexylphosphino-2',4',6'-triisopropylbiphenyl and 280 mL of o-xylene were added. The mixture was heated to 120° C. and was stirred at the temperature for 6 hours. The mixture was cooled to room temperature (25° C.), and an organic phase was extracted with ethyl acetate. The organic phase was washed with saturated saline and then with water and was dried over anhydrous magnesium sulfate. The resulting crude product was purified by column chromatography. Thus, 14.3 g of an M3 intermediate was prepared (yield: 57%).

(2) Synthesis of M3

A 500-mL three-neck flask was charged with 10.0 g of the M3 intermediate, 350 mL of tetrahydrofuran, 0.88 g of hydroquinone monomethyl ether (MEHQ), and 13.0 mL of triethylamine in a nitrogen atmosphere. Subsequently, 12.0 g of methacrylic acid anhydride was added dropwise. The mixture was heated and stirred under reflux for 20 hours. The reaction liquid was diluted with toluene. The resulting organic phase was washed with acidic and basic aqueous solutions and saturated saline and was then dried over anhydrous magnesium sulfate. A crude product prepared by removing the solvent was purified by silica gel chromatography. Thus, 6.5 g of M3 was prepared (yield: 56%).

Exemplary Embodiments (1) Measurement of Secondary Dispersion Characteristics ($\theta_{g,F}$)

A resin composition was placed inside a spacer 500 μm in thickness located on a high refractive index glass 1 mm in thickness ("S-TIH11" manufactured by HOYA Corporation). The resin composition contained the exemplary compound M1 synthesized in Synthesis Example 1, a polymerization inhibitor (methoxyphenol manufactured by FUJIFILM Wako Pure Chemical Corporation), and a polymerization initiator ("Irgacure TPO" manufactured by BASF, diphenyl(2,4,6-trimethylbenzoyl)phosphine oxide). A quartz glass sheet was then placed on the resin composition to be measured, and the resin composition was spread to a thickness of 500 μm inside the spacer. The resin composition between the two glass substrates was cured by light irradiation from a high-pressure mercury lamp "EX250" manufactured by HOYA-SCHOTT equipped with a short-wavelength cut filter (UV: 385 nm) used as a light source. After curing, heat treatment was performed at 100° C. for 12 hours to complete the reaction. Thus, a measurement sample was prepared. The refractive index of the measurement sample was measured with an Abbe refractometer (manufactured by Kalnew Optical Industrial Co., Ltd.). The secondary dispersion characteristics ($\theta_{g,F}$) was calculated from the refractive index and was evaluated. A secondary dispersion characteristics of 0.70 or more was rated good. The glass substrates should have a higher refractive index than a cured product of the resin composition. Table 4 shows the evaluation results.

(2) Transmittance Measurement

A transmittance measurement sample 500 μm in thickness and a transmittance measurement sample 1000 μm in thickness were prepared in the same manner as in the measurement of secondary dispersion. The transmittance measurement sample 500 μm in thickness may be the refractive index measurement sample prepared for the measurement of the secondary dispersion characteristics. The transmittance of each transmittance measurement sample was measured with a spectrophotometer ("U-4000" (product name) manufactured by Hitachi High-Tech Corporation), was converted into internal transmittance (500 μm) at wavelengths of 450 and 500 nm, and was evaluated. A transmittance of 90% or more at a wavelength of 450 nm was rated good. A transmittance of 95% or more at a wavelength of 500 nm was rated good. Table 4 shows the evaluation results.

Exemplary Embodiment 2

A measurement sample was prepared in the same manner as in Exemplary Embodiment 1 except that a resin 1 (1,6-hexanediol methacrylate, manufactured by Tokyo Chemical Industry Co., Ltd.) was added to the resin composition at a mass ratio of exemplary compound M1:resin 1=90:10. The secondary dispersion characteristics ($\theta_{g,F}$) and transmittance were then measured. Table 4 shows the evaluation results.

Exemplary Embodiments 3 to 14

As shown in Table 4, measurement samples were prepared in the same manner as in Exemplary Embodiment 2 except that the exemplary compounds were changed, and the secondary dispersion characteristics ($\theta_{g,F}$) and transmittance were measured in the same manner. Table 4 shows the evaluation results.

Comparative Example 1

A comparative example compound R1 was synthesized, and the secondary dispersion characteristics ($\theta_{g,F}$) and transmittance were compared. Table 4 shows the results.

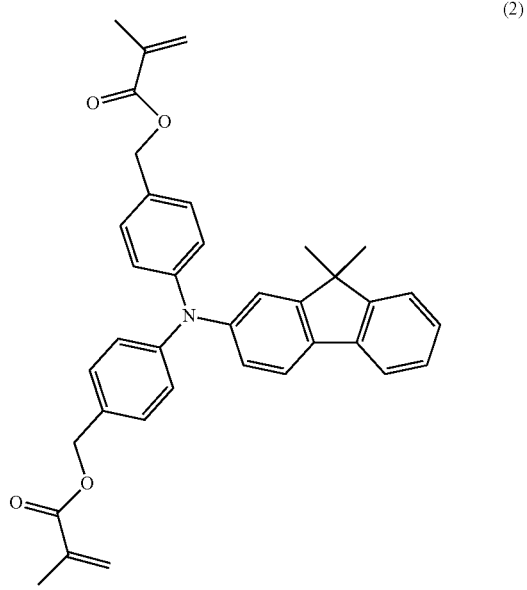 [SMILES: C=C(C)C(=O)OCc1ccc(N(c2ccc(COC(=O)C(=C)C)cc2)c2ccc3c(c2)C(C)(C)c2ccccc2-3)cc1]

(2)

Comparative Example Compound R1

Comparative Example 2

A comparative example compound R2 was synthesized, and the secondary dispersion characteristics ($\theta_{g,F}$) and transmittance were compared. Table 4 shows the results.

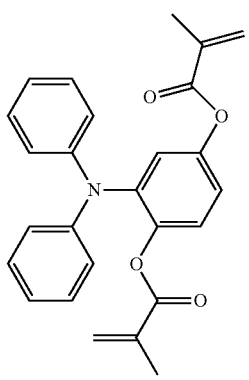

(3)

Comparative Example Compound R2

TABLE 4

| | Compound | $\theta_{g,F}$ | Transmittance (%) 450 nm | 500 nm |
|---|---|---|---|---|
| Example 1 | M1 | 0.72 | 99 | 99 |
| Example 2 | M1 | 0.72 | 99 | 99 |
| Example 3 | M3 | 0.73 | 99 | 99 |
| Example 4 | M4 | 0.73 | 99 | 99 |
| Example 5 | M7 | 0.77 | 98 | 99 |
| Example 6 | M10 | 0.75 | 98 | 99 |
| Example 7 | M11 | 0.72 | 98 | 99 |
| Example 8 | M12 | 0.71 | 97 | 99 |
| Example 9 | M15 | 0.70 | 97 | 99 |
| Example 10 | M18 | 0.74 | 97 | 99 |
| Example 11 | M22 | 0.71 | 99 | 99 |
| Example 12 | M24 | 0.76 | 98 | 99 |
| Example 13 | M27 | 0.73 | 99 | 99 |
| Example 14 | M30 | 0.70 | 96 | 98 |
| Comparative example 1 | Comparative example compound R1 | 0.78 | 72 | 80 |
| Comparative example 2 | Comparative example compound R2 | 0.69 | 85 | 88 |

The results in Table 4 show that Exemplary Embodiments 1 to 14 had a secondary dispersion characteristics of 0.70 or more and a high transmittance of 90% or more at 450 nm and 95% or more at 500 nm. By contrast, Comparative Example 1 had a high secondary dispersion characteristics of 0.78 but had a transmittance of 72% at 450 nm and 80% at 500 nm, which are lower than those of Exemplary Embodiments 1 to 14. This is because the substituted phenyl groups of the compound in Comparative Example 1 did not have a trifluoromethyl group, which has the effect of improving transmittance due to steric hindrance. Comparative Example 2 had a lower secondary dispersion characteristics and a lower transmittance than Exemplary Embodiments 1 to 14. Comparative Example 2 had a shorter conjugated structure than Comparative Example 1 and therefore had a higher transmittance than Comparative Example 1. However, the substituted phenyl groups of the compound in Comparative Example 2 also did not have a trifluoromethyl group, which has the effect of improving transmittance due to steric hindrance, and had insufficient transmittance.

Exemplary Embodiments 1 to 7 and 11 to 13 had a higher transmittance than Exemplary Embodiments 8 to 10 and 14 at a wavelength of 450 nm. This is because $X_1$ and $X_2$ in the formula (1) of the compounds in Exemplary Embodiments 1 to 7 and 11 to 13 were the same substituted phenyl group.

The compounds of the formula (1) in Exemplary Embodiments 1 to 7 and 11 to 13 had higher symmetry and a shorter intermolecular distance than the compounds in Exemplary Embodiments 8 to 10 and 14. A shorter intermolecular distance probably results in a high secondary dispersion characteristics and high transmittance.

These results show that a cured product containing a compound represented by the formula (1) had a high secondary dispersion characteristics ($\theta_{g,F}$) and high transmittance.

The present disclosure can provide an optical element containing a cured product with a high refractive index secondary dispersion characteristics ($\theta_{g,F}$), that is, a good chromatic aberration correction function, and high transmittance.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-183651, filed Nov. 2, 2020, which is hereby incorporated by reference herein in its entirety.

What is claimed is:

1. An optical element comprising:
a cured product of a polymer of a resin composition,
wherein the resin composition contains a compound represented by the following formula (1):

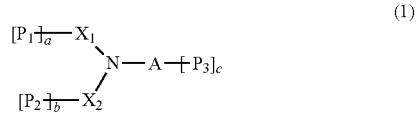

(1)

wherein
$X_1$ denotes a substituted phenyl group, the substituted phenyl group having at least one trifluoromethyl group and optionally substituted with at least one member selected from the group consisting of a hydrogen atom, an alkyl group having 1 to 4 carbon atoms, and an alkylene group having 1 to 3 carbon atoms,
$X_2$ denotes a substituted phenyl group, $X_2$ being the same substituted phenyl group as $X_1$,
A denotes at least one member selected from the group consisting of a substituted or unsubstituted phenyl group and a substituted or unsubstituted biphenyl group, the substituted phenyl group and the substituted biphenyl group having at least one member selected from the group consisting of a hydrogen atom, a trifluoromethyl group, an alkyl group having 1 to 4 carbon atoms, and an alkylene group having 1 to 3 carbon atoms, and
$P_1$, $P_2$, and $P_3$ independently denote an acryloyloxy group or a methacryloyloxy group, a, b, and c denote any one of 0, 1, and 2, and a+b+C denotes any one of 1, 2, and 3.

2. The optical element according to claim 1, wherein the cured product has a secondary dispersion characteristics of 0.70 or more.

3. The optical element according to claim 1, wherein the cured product contains at least one of an acrylate resin and a methacrylate resin.

4. The optical element according to claim 3, wherein the cured product has an acrylate resin and methacrylate resin content in the range of 0.01% to 20.0% by mass.

5. The optical element according to claim 1, wherein the cured product is provided on a transparent substrate.

6. The optical element according to claim 1, wherein the cured product is located between two transparent substrates.

7. An optical apparatus comprising:
a housing; and
an optical system having a plurality of lenses in the housing, wherein
at least one of the plurality of lenses is the optical element according to claim 1.

8. An imaging apparatus comprising:
a housing;
an optical system having a plurality of lenses in the housing; and
an imaging device configured to receive light passing through the optical system, wherein
at least one of the plurality of lenses is the optical element according to claim 1.

9. The imaging apparatus according to claim 8, wherein the imaging apparatus is a camera.

* * * * *